United States Patent
Kim et al.

(10) Patent No.: US 7,702,024 B2
(45) Date of Patent: Apr. 20, 2010

(54) SAMPLING FREQUENCY OFFSET ESTIMATION APPARATUS AND METHOD FOR OFDM SYSTEM

(75) Inventors: Yun-young Kim, Suwon-si (KR); Jae-ho Roh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 920 days.

(21) Appl. No.: 11/488,696

(22) Filed: Jul. 19, 2006

(65) Prior Publication Data

US 2007/0019763 A1    Jan. 25, 2007

(30) Foreign Application Priority Data

Jul. 19, 2005    (KR) ............... 10-2005-0065526

(51) Int. Cl.
*H04K 1/10* (2006.01)
(52) U.S. Cl. ............... 375/260
(58) Field of Classification Search ......... 375/260, 375/316, 344, 346, 355, 362; 370/208, 210, 370/505
See application file for complete search history.

(56) References Cited

U.S. PATENT DOCUMENTS 7,308,034 B2 * 12/2007 Jeon et al. ............ 375/260

2004/0184551 A1 * 9/2004 Liu et al. ............ 375/260
2005/0100106 A1 * 5/2005 Chen ............ 375/260

FOREIGN PATENT DOCUMENTS

| CN | 1719818 A | 1/2006 |
|---|---|---|
| JP | 11-205275 A | 7/1999 |
| JP | 2000-151545 A | 5/2000 |
| JP | 2000-295195 A | 10/2000 |

\* cited by examiner

*Primary Examiner*—Young T. Tse
(74) *Attorney, Agent, or Firm*—Sughrue Mion, PLLC

(57) ABSTRACT

A sampling frequency offset estimation apparatus and method to be applied to an OFDM (orthogonal frequency division multiplexing) system are provided. The apparatus includes an ADC (analog-to-digital converter) sampling a received signal based on a predetermined sampling frequency; a FFT (Fast Fourier Transform) unit transforming the sampled received signal into a frequency domain; a phase calculator calculating phase shifts of pilot subcarriers of the sampled received signal which has been transformed into the frequency domain; a determiner calculating phase shift reaching times at which samples of the pilot subcarriers shift due to the phase shift; a time offset calculator calculating a sampling time offset using the pilot subcarriers, and a frequency offset calculator calculating a sampling frequency offset based on the phase shift reaching times and the sampling time offset.

16 Claims, 7 Drawing Sheets

SAMPLING FREQUENCY OFFSET ESTIMATION APPARATUS AND METHOD FOR OFDM SYSTEM

CROSS-REFERENCE TO RELATED APPLICATIONS

This application claims priority of Korean Patent Application No. 2005-65526 filed Jul. 19, 2005, in the Korean Intellectual Property Office, the disclosure of which is incorporated herein by reference.

BACKGROUND OF THE INVENTION

1. Field of the Invention

The present invention relates to a sampling frequency offset estimation apparatus and method to be applied to an orthogonal frequency division multiplexing (OFDM) system. More particularly, the present invention relates to a sampling frequency offset estimation apparatus and a method estimating a phase shift of each pilot subcarrier of a received signal to estimate a sampling frequency offset.

2. Description of the Related Art

In an orthogonal frequency division multiplexing OFDM method, a data stream input in series is converted into parallel data of a predetermined block unit, parallel symbols are multiplexed into orthogonal carrier frequencies so as to convert a wideband transmission into a narrowband parallel transmission. Such an OFDM method is robust to multi-path fading in a wireless communication environment and enables a high speed data transmission.

A pilot subcarrier is used to track a sampling frequency offset in an OFDM system. In a method of using a pilot subcarrier, pilot symbol data, which is data known to a transmitter and a receiver, is transmitted so that the receiver uses the data to perform synchronization. The pilot subcarrier is divided into two sets. In other words, there are a pilot position in a negative subcarrier and a pilot position in a positive subcarrier. The sampling frequency offset is tracked using information as to a linear relationship between an offset and a phase rotation occurring due to an index of the pilot subcarrier.

Figure 1A:
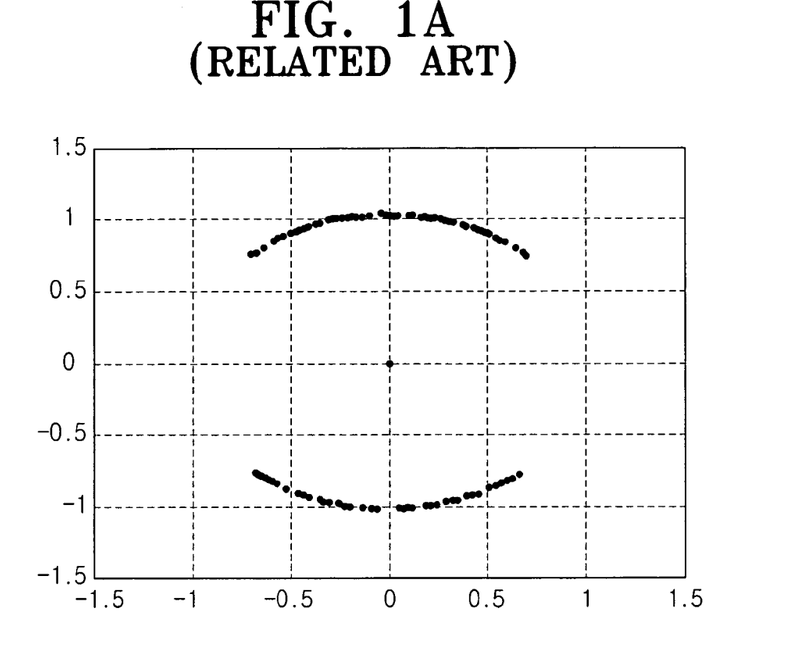
FIGS. 1A and 1B are views illustrating an influence of a sampling frequency offset in an OFDM system.
Figure 1B:
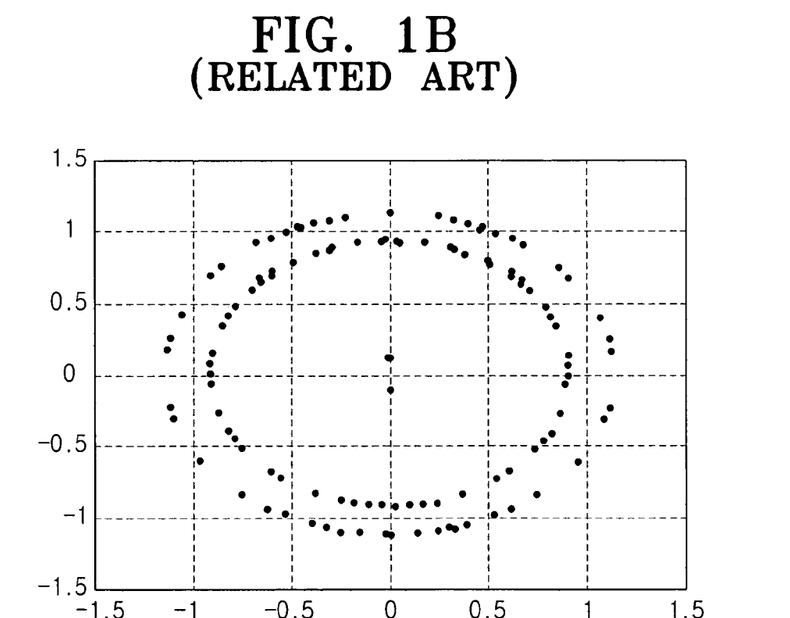

FIGS. 1A and 1B are views illustrating an effect of a sampling frequency offset in an OFDM system. FIG. 1A is a view illustrating distortions of a phase and an amplitude at 30 parts per million (ppm) at which an 0.5 initial time offset occurs, and FIG. 1B is a view illustrating distortions of a phase and an amplitude at 30 ppm at which a 0.5 initial time offset and a one-sample symbol time offset occur.

Figure 2A:
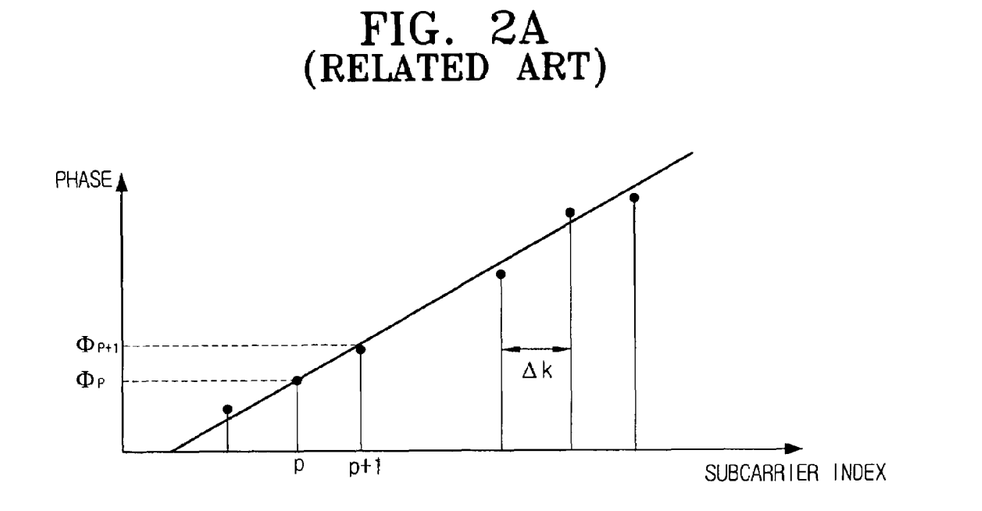
FIGS. 2A and 2B are graphs illustrating an estimation of a sampling frequency offset in a related art OFDM system.
Figure 2B:
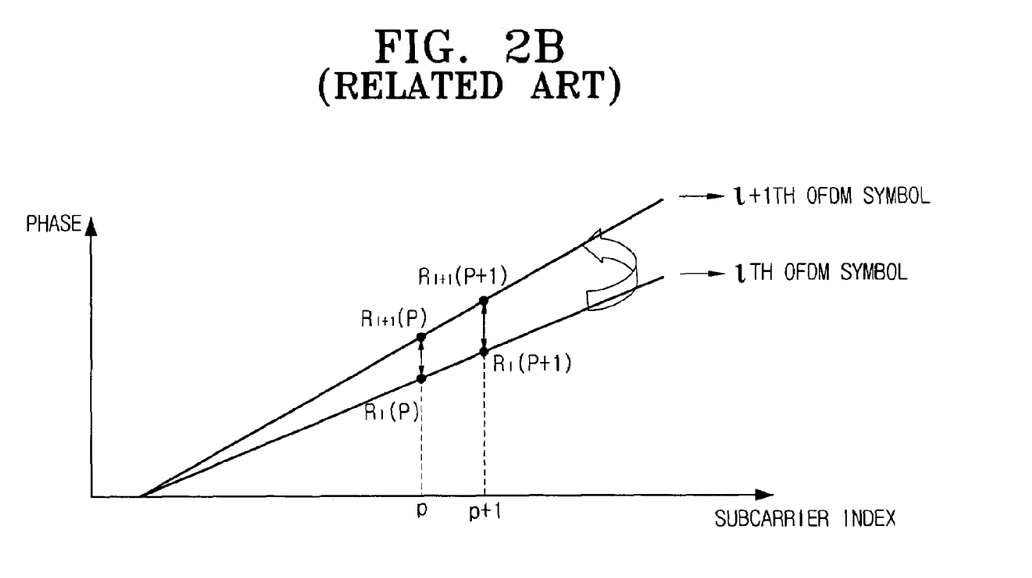

FIGS. 2A and 2B are graphs illustrating an estimation of a sampling frequency offset in a related art OFDM system.

FIG. 2A is a graph illustrating an estimation of a sampling frequency offset using a phase difference between pilot subcarriers. Referring to FIG. 2A, the phase difference between the pilot subcarriers can be computed using Equation 1 as follows:

$$\Phi_{m,p} - \Phi_{m,p+1} = -2\pi \Delta k \Delta t / N \quad \text{[Equation 1]}$$

wherein $\Phi_{m,p}$ denotes a $p^{th}$ pilot subcarrier in an $m^{th}$ OFDM symbol, $\Phi_{m,p+1}$ denotes a phase of a $p+1^{th}$ pilot subcarrier, $\Delta k$ denotes a distance between pilot subcarriers, $\Delta t$ denotes a sampling time offset, and N denotes a Fast Fourier Transform Window Size.

Equation 1 can be expressed with respect to a sampling time offset as follows in Equation 2:

$$\Delta t_{p,p+1} = -\frac{\Phi_{m,p} - \Phi_{m,p+1}}{-2\pi \Delta k / N} \quad \text{[Equation 2]}$$

As shown in Equation 2, a sampling time offset can be computed to estimate a phase slope so as to estimate a sampling frequency offset.

FIG. 2B is a graph illustrating an estimation of a sampling frequency offset using an estimation of a variation in a phase difference between pilot subcarriers with time. Referring to FIG. 2B, the variation in the phase difference between the pilot subcarriers can be computed using Equation 3 as follows:

$$\hat{\epsilon}_{p,p+1} = \frac{1}{2\pi} \left[ \tan^{-1} \left\{ \frac{\mathrm{Im}(R_l(p+1) R^*_{l+1}(p+1))}{\mathrm{Re}(R_l(p+1) R_{l+1}(p+1))} \right\} - \tan^{-1} \left\{ \frac{\mathrm{Im}(R_l(p) R^*_{l+1}(p))}{\mathrm{Re}(R_l(p) R^*_{l+1}(p))} \right\} \right] \quad \text{[Equation 3]}$$

wherein $\hat{\epsilon}_{p,p+1}$ denotes a variation in a phase slope computed using a phase difference between $p^{th}$ and $p+1^{th}$ pilots in $1^{th}$ and $1+1^{th}$ OFDM symbols, $\Delta k$ denotes a distance between pilot subcarriers, and $\Delta t$ denotes a sampling time offset.

Here, the variation in the phase slope may be estimated using a phase difference between $p^{th}$ and $p+1^{th}$ pilots in a symbol delayed by D instead of the $1+1^{th}$ OFDM symbol and an $1^{th}$ symbol.

Figure 3:
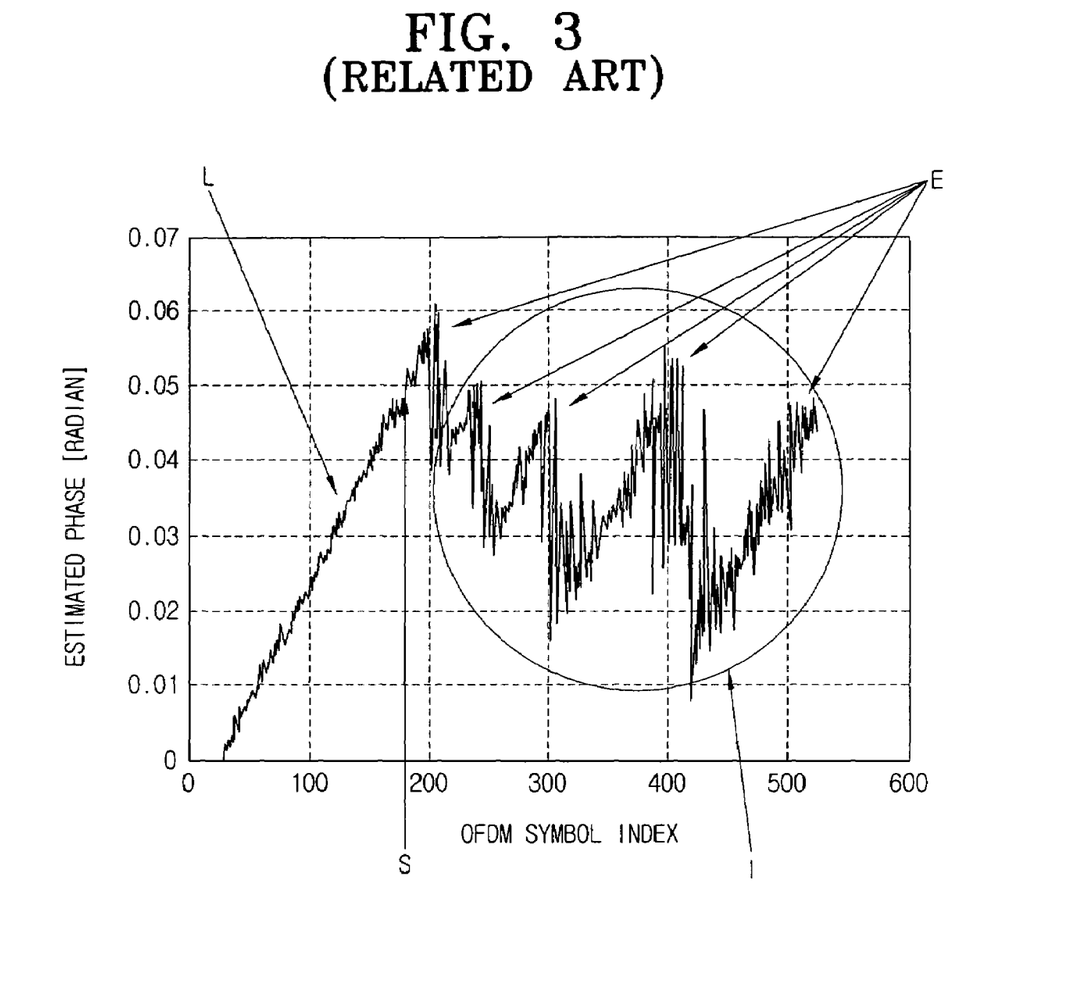
FIG. 3 is a graph illustrating a relationship between a symbol index and a phase estimated by a conventional sampling frequency offset estimation method.

FIG. 3 is a graph illustrating a relationship between a symbol index and a phase estimated by a conventional sampling frequency offset estimation method. Here, S denotes a point of time at which a one sample shifts and at which a distortion occurring due to a sampling frequency offset is required to be compensated for.

Referring to FIG. 3, a phase of a sampling time offset linearly increases with an increase in time in area L. However, a pilot subcarrier having a phase equal to or more $-\pi$ or $\pi$ with time after the area L. Thus, the linearity of a phase between pilot subcarriers is not established. Thus, in a case where an average phase shift depending on an index of a pilot subcarrier is used, a wrong sampling frequency offset may be estimated.

S denotes a point of time at which an average phase slope computed by a plurality of pilot subcarriers varies by one sample and at which a sample must be added or deleted due to an effect of noise and thus has a large standard variation. In other words, in a case where an average phase slope of pilot subcarriers is used, a point of time at which a one sample is added or deleted cannot be precisely detected.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

The present invention provides a sampling frequency offset estimation apparatus and method applied to an OFDM system and capable of computing a phase shift of each pilot subcarrier, not an average phase shift of pilot subcarriers, to precisely estimate a sampling frequency offset.

According to an aspect of the present invention, there is provided a sampling frequency offset estimation apparatus including: an analog-to-digital converter (ADC) sampling a received signal based on a predetermined sampling frequency; a Fast Fourier Transform (FFT) unit transforming the sampled received signal into a frequency domain; a phase calculator calculating phase shifts of pilot subcarriers of the received signal which has been transformed into the frequency domain; a determiner calculating phase shift reaching times at which samples of the pilot subcarriers shift due to the phase shift; a time offset calculator calculating a sampling time offset using the pilot subcarriers; and a frequency offset calculator calculating a sampling frequency offset based on the phase shift reaching times and the sampling time offset.

The sampling frequency offset estimation apparatus may further include a storage storing the pilot subcarriers of the received signal which has been transformed into the frequency domain.

The determiner may detect a symbol index at which phases of the pilot subcarriers are equal to or more than $\pi$ or equal to or less than $-\pi$ to calculate the phase shift reaching times.

According to another aspect of the present invention, there is provided an OFDM system using the sampling frequency offset estimation apparatus.

The OFDM system may further include an equalizer correcting a phase distortion of the received signal based on the estimated sampling frequency offset.

The OFDM system may further include a rob/stuff unit robbing or stuffing one sample based on the estimated sampling frequency offset.

According to still another aspect of the present invention, there is provided a sampling frequency offset estimation method including: transforming a received signal sampled based on a predetermined sampling frequency offset into a frequency domain; and calculating phase shifts of pilot subcarriers of the received signal which has been transformed into the frequency domain and calculating a sampling frequency offset based on phase shift reaching times at which samples of the pilot subcarriers shift due to a phase shift.

The calculating of the sampling frequency offset may include: calculating the phase shifts of the pilot subcarriers of the received signal which has been transformed into the frequency domain; calculating the phase shift reaching times at which the samples of the pilot subcarriers shift due to the phase shift; calculating sampling time offsets using the pilot subcarriers; and calculating a sampling frequency offset based on the phase shift reaching times and the sampling time offsets.

The sampling frequency offset estimation method may further include storing the pilot subcarriers of the received signal which has been transformed into the frequency domain.

The phase shift reaching times may be calculated by detecting a symbol index at which phases of the pilot subcarriers are equal to or more than $\pi$ or equal to or less than $-\pi$.

BRIEF DESCRIPTION OF THE DRAWINGS

The above and other aspects of the present invention will be more apparent by describing certain exemplary embodiments of the present invention with reference to the accompanying drawings, in which.

DETAILED DESCRIPTION OF THE EXEMPLARY EMBODIMENTS

Certain exemplary embodiments of the present invention will be described in greater detail with reference to the accompanying drawings.

In the following description, same drawing reference numerals are used for the same elements even in different drawings. The matters defined in the description, such as a detailed construction and elements, are provided to assist in a comprehensive understanding of the invention. Also, well-known functions or constructions are not described in detail since they would obscure the invention in unnecessary detail.

A rotation of an OFDM system caused by a sampling frequency offset may be corrected using two methods. The first method is a synchronization sampling method by which a sampling frequency of a receiver ADC is changed to correct a rotation of an OFDM system. The second method is an asynchronization sampling method by which a subcarrier is re-rotated to correct a rotation of an OFDM system after Discrete Fourier Transform (DFT).

There will now be described a sampling frequency offset estimation to be applied to an asynchronization sampling method of correcting a rotation phenomenon after sampling a received signal using a sampling frequency and then performing DFT on the received signal.

Figure 4:
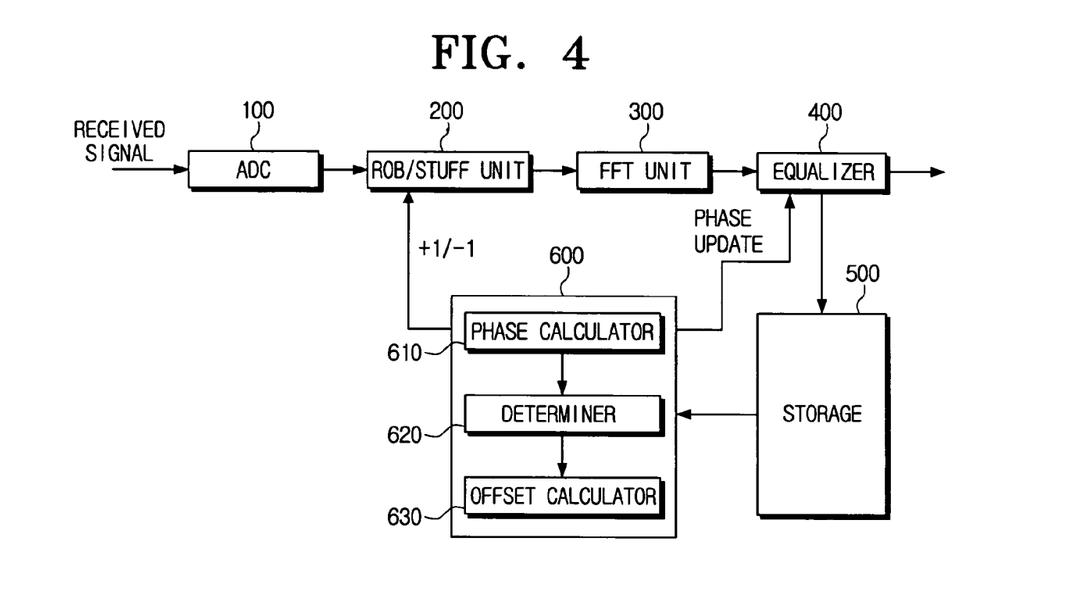
FIG. 4 is a block diagram of an OFDM system to which a sampling frequency offset estimation apparatus is applied according to an exemplary embodiment of the present invention.

FIG. 4 is a block diagram of an OFDM system to which a sampling frequency offset estimation apparatus is applied according to an exemplary embodiment of the present invention.

Referring to FIG. 4, the OFDM system includes an ADC 100, a rob/stuff unit 200, an FFT unit 300, an equalizer 400, a storage 500, and a frequency offset estimator 600.

The ADC 100 samples a received signal using a predetermined sampling frequency generated by an oscillator (not shown).

The FFT unit 300 transforms the sampled received signal into a frequency domain.

The storage 500 stores a pilot subcarrier of the received signal which has been transformed into the frequency domain. A receiver of the OFDM system receives a pilot symbol that is data a transceiver knows about to perform a synchronization so as to additionally store a pilot subcarrier used for a sampling frequency offset estimation.

The frequency offset estimator 600 includes a phase calculator 610, a determiner 620, and an offset calculator 630 and estimates sampling frequency and time offsets based on a phase shift of each of stored pilot subcarrier.

The phase calculator 610 calculates phase shifts of pilot subcarriers of the received signal which has been transformed into the frequency domain. Since the pilot subcarriers have different phase shift rates according to sampling frequency offsets, the phase calculator 610 calculates a phase shift of each of the pilot subcarriers.

The determiner 620 estimates a time at which the phase of each of the pilot subcarriers sharply varies. The determiner 620 estimates a phase shift reaching time at which the phase of each of the pilot subcarriers is equal to or more than $\pi$ or equal to or less than $-\pi$, i.e., a 1-sample shifts. The sampling frequency offset has a linear relationship with a phase rotation occurring due to indexes of the pilot subcarriers. Thus, an upper most pilot subcarrier positioned outside one symbol reaches a time equal to or more than $\pi$ or equal to or less than $-\pi$.

The offset calculator 630 calculates the sampling time offset based on the indexes of the pilot subcarriers and calculates the sampling frequency offset using the calculated sampling time offset and the estimated phase shift reaching time.

The equalizer 400 corrects a distortion of a phase using the sampling time offset estimated by the frequency offset estimator 600.

The rob/stuff unit 200 stuffs a copied sample or robs one sample of a signal based on the sampling frequency offset estimated by the frequency offset estimator 600. A variation in a sampling instant becomes gradually larger than a sampling period due to the sampling frequency offset. Thus, the rob/stuff unit 200 detects a position in which one sample shifts to stuff or rob a sample so as to correct a distortion caused by the sampling frequency offset.

Figure 5:
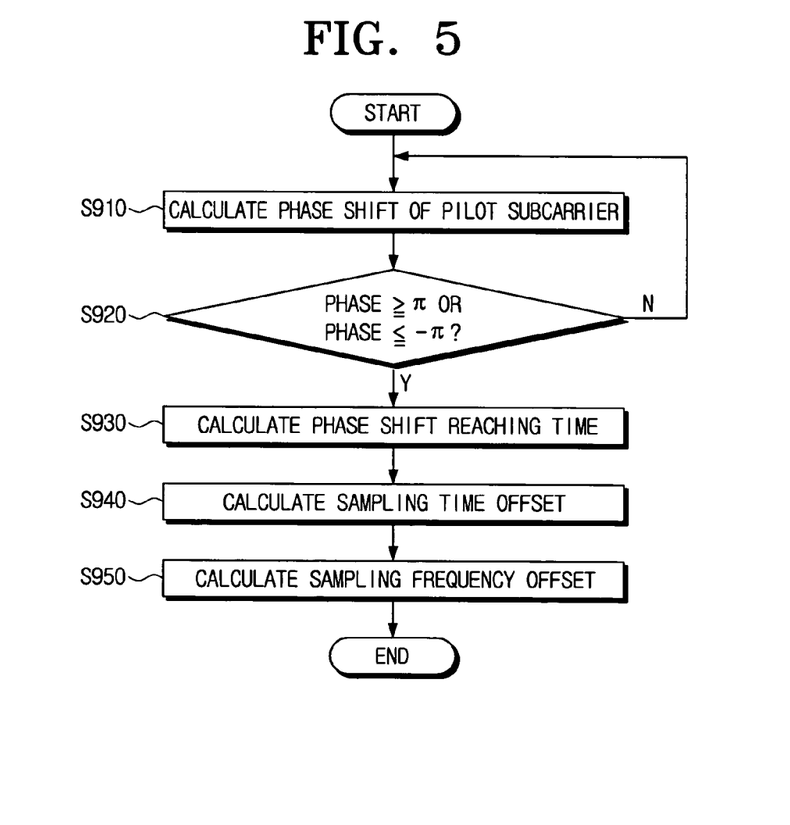
FIG. 5 is a flowchart of a sampling frequency offset estimation method to be applied to an OFDM system according to an exemplary embodiment of the present invention.

FIG. 5 is a flowchart of a sampling frequency offset estimation method to be applied to an OFDM system according to an exemplary embodiment of the present invention.

Referring to FIG. 5, in operation S910, a phase shift of a pilot subcarrier of a received signal that is data a transceiver knows about is calculated. The received signal is sampled using a predetermined sampling frequency and then transformed into a frequency domain using FFT. Phase shifts of pilot subcarriers of the received signal which has been transformed into the frequency domain are calculated based on indexes of the pilot subcarriers.

In operation S920, a determination is made as to whether the phases of the pilot subcarriers are equal to or more than $\pi$ or equal to or less than $-\pi$. The pilot subcarriers have different phase shift rates according to sampling frequency offsets and have linear relationships with phase rotation caused by the sampling frequency offset and the indexes of the pilot subcarriers. Thus, positions in which the phases of the pilot subcarriers are equal to or more than $\pi$ or equal to or less than $-\pi$ vary with the indexes of the pilot subcarriers. Also, an upper pilot subcarrier outside one symbol reaches a position in which a phase is equal to or more than $\pi$ or equal to or less than $-\pi$.

If it is determined in operation S920 that the phases of the pilot subcarriers are equal to or more than $\pi$ or equal to or less than $-\pi$, a phase shift reaching time at which a phase is equal to or more than $\pi$ or equal to or less than $-\pi$ is calculated in operation S930. The phase shift reaching time is calculated using a symbol index of a position in which a phase is equal to or more than $\pi$ or equal to or less than $-\pi$, a sampling time section, and a number of samples per symbol. Here, a time at which a phase is equal to or more than $\pi$ or equal to or less than $-\pi$ is a time at which one sample shifts. The phase shift reaching time at which the one sample shifts can be detected to stuff or rob a sample based on the detected phase shift reaching time so as to correct a distortion caused by the sampling frequency offset.

If it is determined in operation S920 that the phases of the pilot subcarriers are not equal to or more than $\pi$ or equal to or less than $-\pi$, phase shifts of the pilot subcarriers are calculated with increasing symbol index, and then a sampling time offset is calculated in operation S940. The sampling time offset may be calculated based on the indexes of the pilot subcarriers and FFT Window Size.

In operation S950, a sampling frequency offset is calculated based on the phase shift reaching time calculated in operation S930 and the sampling time offset calculated in operation S940. The sampling frequency offset may be calculated by dividing the sampling time offset by the phase shift reaching time.

As described above, a time at which one sample shifts and a sampling time offset are calculated with respect to each of pilot subcarriers having different phase shifts so as to calculate a sampling frequency offset. Thus, a phase shift of an independent pilot subcarrier can be calculated differently from a case where an average phase shift of pilot subcarriers so as to precisely find a time at which the 1-sample is stuffed or robbed.

Here, sampling frequency offsets of a plurality of pilot subcarriers may be calculated to correct a phase shift caused by the sampling frequency offsets. However, the phase shift may be corrected using only the sampling frequency offset of an upper pilot subcarrier of which one sample shifts.

Figure 6:
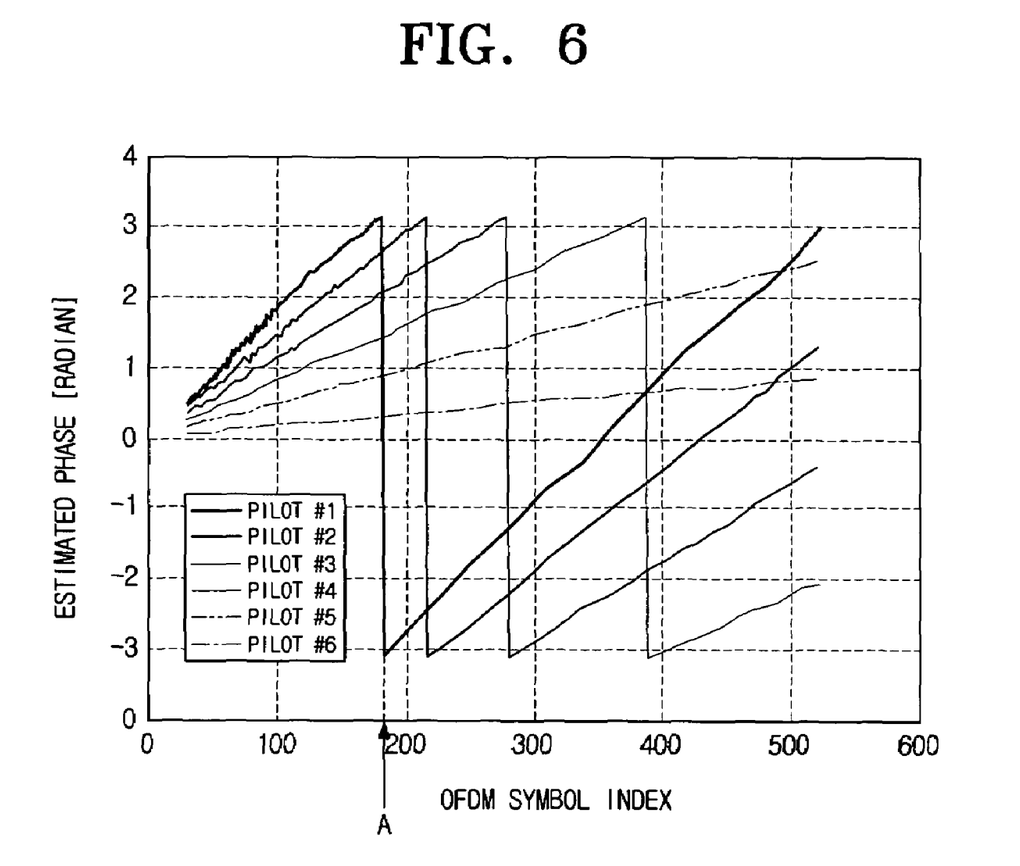
FIG. 6 is a graph illustrating the sampling frequency offset estimation method of FIG. 5 in detail.

FIG. 6 is a graph illustrating the sampling frequency offset estimation method in detail. Referring to FIG. 6, the horizontal axis denotes an OFDM symbol index, and the vertical axis denotes a phase estimated with respect to an index of each pilot subcarrier.

As shown in FIG. 6, a rotation angle occurring with each pilot subcarrier during receiving of an OFDM signal varies with an index of each pilot subcarrier and an OFDM symbol index. The rotation angle is the largest at a pilot subcarrier position outside and increases in consecutive OFDM symbols. In other words, a sampling offset is generally very small. However, a rotation angle increases with an increase in a symbol index. Thus, precise demodulating may be impossible.

Thus, a pilot subcarrier #1 of pilot subcarriers #1 through #6 that is positioned outside first reaches a phase shift reaching time at which a phase is equal to or more than $\pi$ or equal to or less than $-\pi$. Here, A denotes an OFDM symbol index when the pilot subcarrier #1 reaches the phase shift reaching time.

The OFDM symbol index is "182" when the pilot subcarrier #1 reaches the phase shift reaching time. Thus, as described in operation S930, a phase shift reaching time of a pilot subcarrier is calculated using "182" at which a phase of a pilot subcarrier is equal to or more than $\pi$ or equal to or less than $-\pi$, a number of samples per symbol, and a sampling time section as follows in Equation 4:

$$\Delta t_1 = 182 N_S T_S \qquad \text{[Equation 4]}$$

wherein $\Delta t_1$ denotes the phase shift reaching time of the pilot subcarrier #1, "182" denotes the OFMD symbol index at the phase shift reaching time, $N_S$ denotes the number of samples per symbol, and $T_S$ denotes the sampling time section.

Phase shift reaching times of pilot subcarriers #2 through #4 can be calculated using the same method by which the phase shift reaching time of the pilot subcarrier #1 is calculated as follows in Equation 5:

$$\Delta t_2 = 217 N_S T_S$$

$$\Delta t_3 = 278 N_S T_S$$

$$\Delta t_4 = 389 N_S T_S$$

wherein Δt1, Δt2, Δt3 denote the phase shift reaching times of the pilot subcarriers #2 through #4, respectively.

A sampling time offset of each pilot subcarrier is calculated using an index of each pilot subcarrier and FFT Window Size as in Equation 6 as described in operation S940.

$$\delta_1 = \frac{N}{(2*55)} \quad \text{[Equation 6]}$$

wherein $\delta_1$ denotes a sampling time offset of the pilot subcarrier #1, N denotes FFT Window Size, and "55" denotes an index of the pilot subcarrier #1.

Sampling time offsets of the pilot subcarriers #2 through #4 are calculated using the same method by which the sampling time offset of the pilot subcarrier #1 is calculated as follows in Equation 7:

$$\delta_2 = \frac{N}{(2*45)} \quad \text{[Equation 7]}$$

$$\delta_3 = \frac{N}{(2*35)}$$

$$\delta_4 = \frac{N}{(2*25)}$$

wherein $\delta_2$, $\delta_3$, $\delta_4$ and denote the sampling time offsets of the pilot subcarriers #2 through #4, and "45," "35," and "25" denote indexes of the pilot subcarriers #2 through #4, respectively.

A sampling frequency offset is calculated using the phase shift reaching time and the sampling time offset as described in operation S950. Thus, the sampling frequency offset can be calculated as follows in Equation 8:

$$\Delta f_S = \Delta\delta/\Delta t \quad \text{[Equation 8]}$$

wherein $\Delta f_S$ denotes the sampling frequency offset, $\Delta\delta$ denotes the sampling time offset, and $\Delta t$ denotes the phase shift reaching time of the pilot subcarrier.

As shown in Equation 8, each sampling frequency offset may be calculated using each pilot subcarrier to stuff or rob a sample so as to correct a phase shift caused by the sampling frequency offset. Alternatively, only a sampling frequency offset of an upper pilot subcarrier of a plurality of subcarriers reaching a phase shift reaching time may be calculated.

If the number of samples per symbol is "165" as shown in FIG. 6, the sampling frequency offset of the pilot subcarrier that is the upper pilot subcarrier calculated using Equations 4, 6, and 8 is "−40 ppm." Thus, a sample may be stuffed into the pilot subcarrier per 250 samples so as to correct a phase distortion caused by the sampling frequency offset.

Figure 7A:
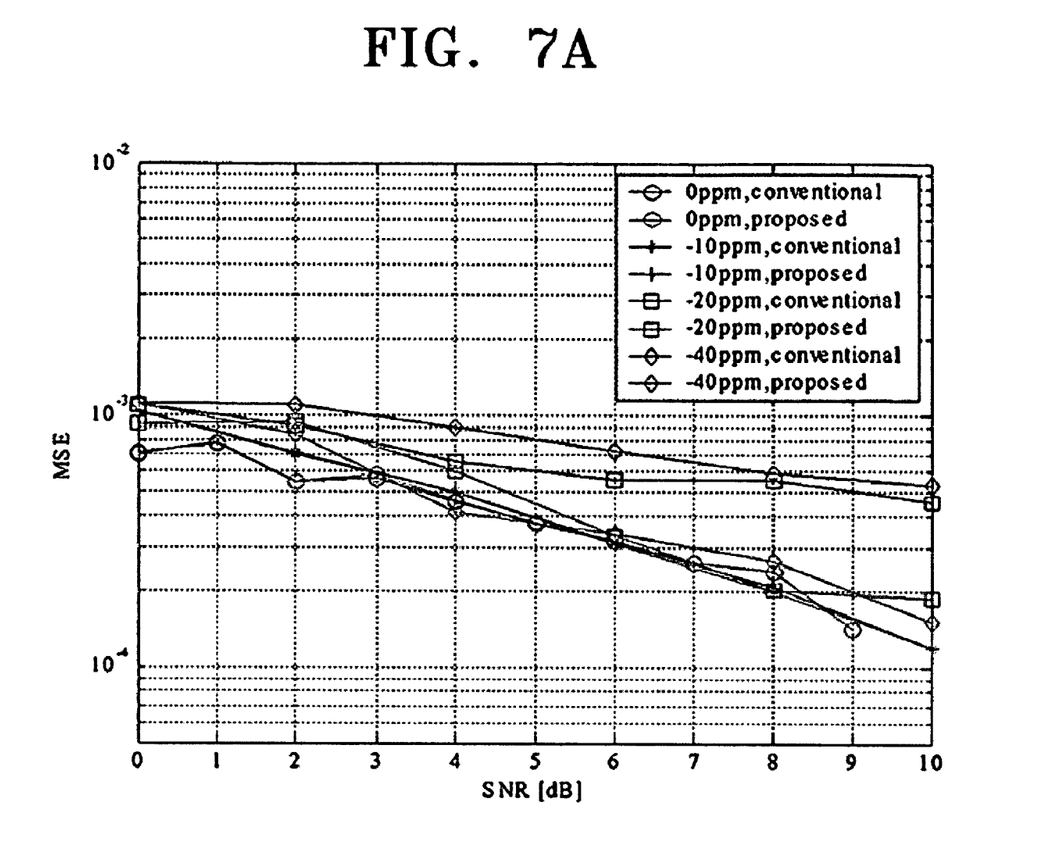
FIGS. 7A and 7B are graph illustrating results of a simulation performed with respect to performances of the conventional sampling frequency offset estimation method and the sampling frequency offset estimation method according to an exemplary embodiment of the present invention.
Figure 7B:
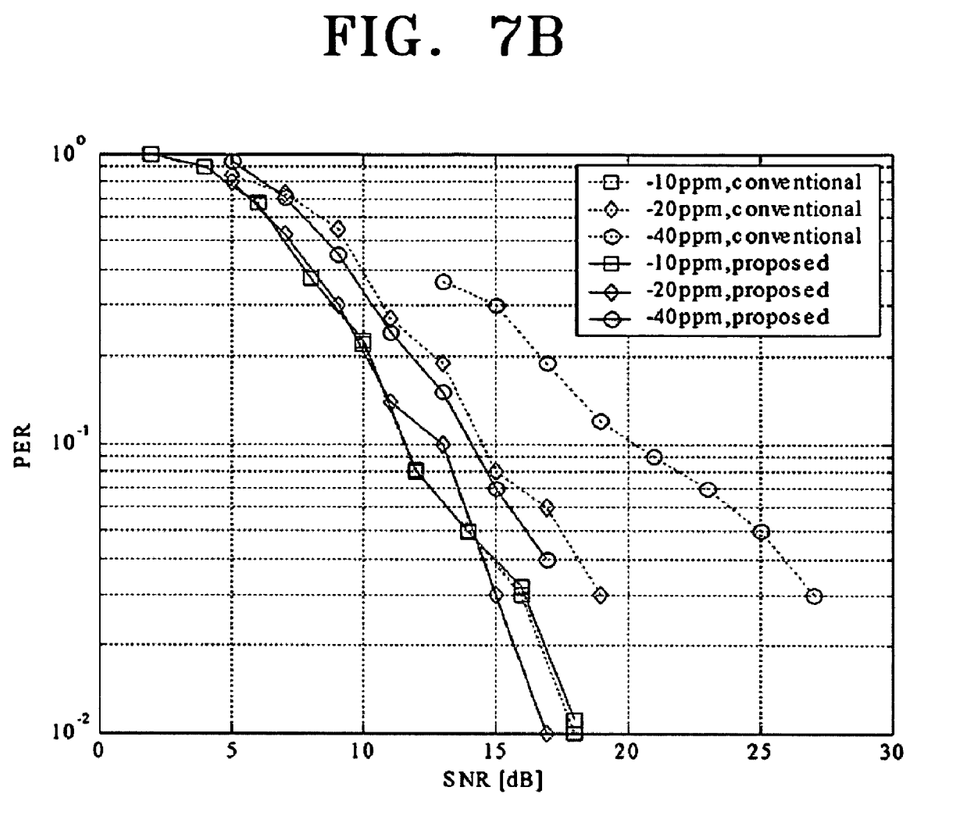

FIGS. 7A and 7B are graphs illustrating results of a simulation performed with respect to performances of the conventional sampling frequency offset estimation method and the sampling frequency offset estimation method of the present invention. FIG. 7A is a graph illustrating a mean square error (MSE) with respect to a variation in a signal-to-noise rate (SNR), and FIG. 7B is a graph illustrating a packet error rate (PER) with respect to an SNR.

If a sampling frequency offset is "0 ppm," "−10 ppm," "−20 ppm," or "−40 ppm," an MSE as shown in FIG. 7A can be obtained. As shown in FIG. 7A, the MSE obtained by the sampling frequency offset estimation method of the present invention is more reduced than the MSE obtained by the conventional sampling frequency offset estimation method.

If the sampling frequency offset is "−10 ppm," "−20 ppm," "−40 ppm," a PER as shown in FIG. 7B can be obtained. As shown in FIG. 7B, the PER obtained by the sampling frequency offset estimation method of the present invention is more reduced than the PER obtained by the conventional sampling frequency offset estimation method.

In an ultra wide band (UWB) OFDM system, a sampling rate is set to 528 MHz, an OFDM symbol size is set to "165," and a data rate is set to 53.3 Mpbs. Also, a payload size is set to 1024 bytes, and a multi-path channel model is set to CM1.

As described above, according to the present invention, a phase shift of each pilot subcarrier can be calculated to precisely estimate a sampling frequency offset. Also, a phase distortion caused by the sampling frequency offset can be precisely corrected.

The foregoing exemplary embodiment and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A sampling frequency offset estimation apparatus comprising:
    a phase calculator which calculates phase shifts of pilot subcarriers, of a sampled received signal which has been sampled and transformed into a frequency domain;
    a determiner which calculates phase shift reaching times of the pilot subcarriers at which one sample of the pilot subcarriers shifts due to the phase shifts;
    a time offset calculator which calculates sampling time offsets of the pilot subcarriers using the pilot subcarriers; and
    a frequency offset calculator which calculates a sampling frequency offset based on the phase shift reaching times and the sampling time offsets,
    wherein each of the phase shifts, each of the phase shift reaching times and each of the sampling time offsets are calculated with respect to each of the pilot subcarriers.

2. The sampling frequency offset estimation apparatus of claim 1, further comprising a storage which stores the pilot subcarriers of the received signal which has been sampled and transformed into the frequency domain.

3. The sampling frequency offset estimation apparatus of claim 1, wherein the determiner detects a symbol index at which phases of the pilot subcarriers are equal to or greater than π or equal to or less than −π to calculate the phase shift reaching times.

4. A receiver of an orthogonal frequency division multiplexing, system, the receiver comprising:
    an analog-to-digital converter which samples a received signal based on a predetermined sampling frequency;
    a Fast Fourier Transform unit which transforms the sampled received signal into a frequency domain;
    a phase calculator which calculates phase shifts of pilot subcarriers of the sampled received signal which has been transformed into the frequency domain;

a determiner which calculates phase shift reaching times of the pilot subcarriers at which one sample of the pilot subcarriers shifts due to the phase shifts;

a time offset calculator which calculates sampling time offsets of the pilot subcarriers using the pilot subcarriers; and a frequency offset calculator which calculates a sampling frequency offset based on the phase shift reaching times and the sampling time offsets, wherein each of the phase shifts, each of the phase shift reaching times and each of the sampling time offsets are calculated with respect to each of the pilot subcarriers.

5. The receiver of claim 4, wherein the determiner detects a symbol index at which phases of the pilot subcarriers are equal to or greater than $\pi$ or equal to or less than $-\pi$ to calculate the phase shift reaching times.

6. The receiver of claim 4, further comprising an equalizer which corrects a phase distortion of the sampled received signal based on an estimated sampling frequency offset.

7. The receiver of claim 4, further comprising a rob or stuff unit robbing or stuffing one sample based on the sampling frequency offset.

8. A sampling frequency offset estimation method comprising:

calculating phase shifts of pilot subcarriers of a signal which is received at a receiver, and has been sampled and transformed into a frequency domain; and calculating a sampling frequency offset based on phase shift reaching times of each of the pilot subcarriers at which samples of the pilot subcarriers shift due to the phase shifts, wherein each of the phase shifts and each of the phase shift reaching times are calculated with respect to each of the pilot subcarriers.

9. The sampling frequency offset estimation method of claim 8, wherein the calculating of the sampling frequency offset comprises:

calculating the phase shift reaching times at which the samples of the pilot subcarriers shift due to the phase shifts;

calculating sampling time offsets using the pilot subcarriers; and calculating the sampling frequency offset based on the phase shift reaching times and the sampling time offsets.

10. The sampling frequency offset estimation method of claim 9, further comprising storing the pilot subcarriers of the received signal which has been sampled and transformed into the frequency domain.

11. The sampling frequency offset estimation method of claim 9, wherein the phase shift reaching times are calculated by detecting a symbol index at which phases of the pilot subcarriers are equal to or greater than $\pi$ or equal to or less than $-\pi$.

12. A method of correcting phase distortion at a receiver in an orthogonal frequency division multiplexing system, the method comprising sampling a received signal based on a predetermined sampling frequency;

transforming the sampled received signal into a frequency domain;

calculating phase shifts of pilot subcarriers of the received signal which has been sampled and transformed into the frequency domain; and calculating a sampling frequency offset based on phase shift reaching times of each of the pilot subcarriers at which samples of the pilot subcarriers shift due to the phase shifts; and correcting the phase distortion of the sampled received signal based on the sampling frequency offset, wherein each of the phase shifts and each of the phase shift reaching times are calculated with respect to each of the pilot subcarriers.

13. The method of claim 12, wherein the calculating of the sampling frequency offset comprises:

calculating the phase shift reaching times at which the samples of the pilot subcarriers shift due to the phase shifts;

calculating sampling time offsets using the pilot subcarriers; and calculating the sampling frequency offset based on the phase shift reaching times and the sampling time offsets.

14. The method of claim 12, further comprising storing the pilot subcarriers of the received signal which has been sampled and transformed into the frequency domain.

15. The method of claim 12, wherein the phase shift reaching times are calculated by detecting a symbol index at which phases of the pilot subcarriers are equal to or greater than $\pi$ or equal to or less than $-\pi$.

16. The method of claim 12, further comprising robbing or stuffing one sample based on the sampling frequency offset.

* * * * *